US012804399B2

(12) United States Patent
Bommisetty et al.

(10) Patent No.: US 12,804,399 B2
(45) Date of Patent: Nov. 17, 2026

(54) USAGE OF ACCESS TOKEN IN SERVICE BASED ARCHITECTURE

(71) Applicant: Nokia Technologies Oy, Espoo (FI)

(72) Inventors: Sireesha Bommisetty, Bangalore (IN); Mallikarjunudu Makham, Bangalore (IN); Topuri Brahmaiah, Bangalore (IN); Saurabh Khare, Bangalore (IN); Anja Jerichow, Munich (DE)

(73) Assignee: Nokia Technologies Oy, Espoo (FI)

( * ) Notice: Subject to any disclaimer, the term of this patent is extended or adjusted under 35 U.S.C. 154(b) by 648 days.

(21) Appl. No.: 18/337,794

(22) Filed: Jun. 20, 2023

(65) Prior Publication Data

US 2024/0064512 A1 Feb. 22, 2024

(30) Foreign Application Priority Data

Aug. 16, 2022 (IN) ............................ 202241046532

(51) Int. Cl.
*H04W 12/082* (2021.01)
*H04W 12/069* (2021.01)
*H04W 12/08* (2021.01)
*H04W 84/04* (2009.01)

(52) U.S. Cl.
CPC ....... *H04W 12/082* (2021.01); *H04W 12/069* (2021.01); *H04W 84/042* (2013.01)

(58) Field of Classification Search
CPC .................................................. H04L 63/0807
See application file for complete search history.

(56) References Cited

U.S. PATENT DOCUMENTS

| | | | | |
|---|---|---|---|---|
| 10,819,636 | B1 * | 10/2020 | Goel | H04L 47/20 |
| 2021/0288802 | A1 | 9/2021 | Muhanna et al. | |
| 2022/0191028 | A1 * | 6/2022 | Aggarwal | H04L 9/3213 |
| 2022/0294775 | A1 * | 9/2022 | Singh | H04L 63/0815 |
| 2022/0338104 | A1 * | 10/2022 | Son | H04W 12/06 |
| 2022/0353802 | A1 * | 11/2022 | Gupta | H04W 8/00 |
| 2023/0199497 | A1 * | 6/2023 | Krishan | H04L 63/0281 726/12 |

(Continued)

OTHER PUBLICATIONS

"3rd Generation Partnership Project; Technical Specification Group Services and System Aspects; Security architecture and procedures for 5G system (Release 17)", 3GPP TS 33.501, V17.6.0, Jun. 2022, pp. 1-292.

(Continued)

*Primary Examiner* — San Htun
(74) *Attorney, Agent, or Firm* — Barta Jones, PLLC

(57) ABSTRACT

Embodiments of the present disclosure relate to usage of access token in service based architecture. According to one aspect of the present disclosure, a first network device transmits an access token request to a second network device, and receives, from the second network device, an access token associated with a first count value, the first count value indicating the number of times the access token is allowed to be used. The first network device transmits, to a third network device, a service request with the access token; and receives, from the third network device, a service response determined based on the first count value and the access token. In this way, usage of an access token may be restricted and chance of misuse of the access token may be reduced.

12 Claims, 8 Drawing Sheets

(56) References Cited

U.S. PATENT DOCUMENTS

2023/0396602 A1* 12/2023 Wu ....................... H04L 9/3213

OTHER PUBLICATIONS

"3rd Generation Partnership Project; Technical Specification Group Services and System Aspects; Study on enhanced security aspects of the 5G Service Based Architecture (SBA); (Release 18)", 3GPP TR 33.875, V1.2.0, May 2022, pp. 1-52.
"Restricted use of access token in SBA", 3GPP TSG-SA3 Meeting #108e, S3-22xxxx, Nokia, Aug. 22-26, 2022, 2 pages.
Extended European Search Report received for corresponding European Patent Application No. 23182297.4, dated Jan. 5, 2024, 10 pages.
"SBA Authorization Framework", 3GPP TSG SA WG3 (Security) Meeting #90Bis, S3-180714, Agenda Item: 4.1.13.4 NF-NF Authentication & Authorization, Ericsson, Feb. 26-Mar. 2, 2018, 4 pages.
"3rd Generation Partnership Project; Technical Specification Group Services and System Aspects; Security architecture and procedures for 5G system (Release 16)", 3GPP TS 33.501, V16.11.0, Jun. 2022, pp. 1-257.
Lee et al., "TBAS: Token-based authorization service architecture in Internet of things scenarios", International Journal of Distributed Sensor Networks, vol. 13, No. 7, Jul. 14, 2017, pp. 1-14, Best Available Dates: Dec. 15, 2016 & Jun. 8, 2017.
Marcon, "Scope values Section and Appendix", Open Mobile Alliance, Sep. 1, 2011, pp. 1-8.
Notice of Allowance received for corresponding European Patent Application No. 23182297.4, dated Oct. 24, 2024, 7 pages.

* cited by examiner

USAGE OF ACCESS TOKEN IN SERVICE BASED ARCHITECTURE

FIELD

Various example embodiments relate to the field of telecommunication and in particular, to a method, device, apparatus and computer readable storage medium for usage of an access token in a service based architecture (SBA).

BACKGROUND

A network repository function (NRF) is a key component of a SBA in the fifth generation (5G) network. The NRF maintains an updated repository of profiles of network functions (NFs) available in a respective core network. An NF (e.g., a network function consumer (NFc)) may fetch an access token from the NRF and send the access token to a target NF so as to use any service of the target NF (e.g., a network function producer (NFp)). Before the access token expires, the NFc may use the access token for any number of times to request services of the NFp. As the access token may be cached and reused by any NFc or service communication proxy for NFc (SCPc) before expiration, chances of misuse of the access token may be high.

SUMMARY

In general, example embodiments of the present disclosure provide a solution for restricting usage of an access token.

In a first aspect, there is provided a first network device. The first network device comprises at least one processor; and at least one memory storing instructions that, when executed by the at least one processor, cause the first network device at least to: transmit an access token request to a second network device; receive, from the second network device, an access token associated with a first count value, the first count value indicating the number of times the access token is allowed to be used; transmit, to a third network device, a service request with the access token; and receive, from the third network device, a service response determined based on the first count value and the access token.

In a second aspect, there is provided a second network device. The second network device comprises at least one processor; and at least one memory storing instructions that, when executed by the at least one processor, cause the second network device at least to: receive an access token request from a first network device; determine a first count value indicating the number of times an access token is allowed to be used; and transmit, to the first network device, the access token associated with the first count value.

In a third aspect, there is provided a third network device. The third network device comprises at least one processor; and at least one memory storing instructions that, when executed by the at least one processor, cause the third network device at least to: receive, from a first network device, a service request with an access token, the access token being associated with a first count value, the first count value indicating the number of times the access token is allowed to be used; determine a stored count value based on the access token; determine a service response based on the stored count value; and transmit the service response to the first network device.

In a fourth aspect, there is provided a method for communication. The method comprises: transmitting, at a first network device, an access token request to a second network device; receiving, from the second network device, an access token associated with a first count value, the first count value indicating the number of times the access token is allowed to be used; transmitting, to a third network device, a service request with the access token; and receiving, from the third network device, a service response determined based on the first count value and the access token.

In a fifth aspect, there is provided a method for communication. The method comprises: receiving, at a second network device, an access token request from a first network device; determining a first count value indicating the number of times an access token is allowed to be used; and transmitting, to the first network device, the access token associated with the first count value.

In a sixth aspect, there is provided a method for communication. The method comprises: receiving, at a third network device and from a first network device, a service request with an access token, the access token being associated with a first count value, the first count value indicating the number of times the access token is allowed to be used; determining a stored count value based on the access token; determining a service response based on the stored count value; and transmitting the service response to the first network device.

In a seventh aspect, there is provided an apparatus for communication. The apparatus comprises: means for transmitting, at a first network device, an access token request to a second network device; means for receiving, from the second network device, an access token associated with a first count value, the first count value indicating the number of times the access token is allowed to be used; means for transmitting, to a third network device, a service request with the access token; and means for receiving, from the third network device, a service response determined based on the first count value and the access token.

In an eighth aspect, there is provided an apparatus for communication. The apparatus comprises: means for receiving, at a second network device, an access token request from a first network device; means for determining a first count value indicating the number of times an access token is allowed to be used; and means for transmitting, to the first network device, the access token associated with the first count value.

In a ninth aspect, there is provided an apparatus for communication. The apparatus comprises: means for receiving, at a third network device and from a first network device, a service request with an access token, the access token being associated with a first count value, the first count value indicating the number of times the access token is allowed to be used; means for determining a stored count value based on the access token; means for determining a service response based on the stored count value; and means for transmitting the service response to the first network device.

In a tenth aspect, there is provided a non-transitory computer readable medium comprising program instructions that, when executed by an apparatus, cause the apparatus to perform at least the method according to any of the fourth to sixth aspects.

In an eleventh aspect, there is provided a computer program comprising instructions, which, when executed by an apparatus, cause the apparatus to perform at least the method according to any of the fourth to sixth aspects.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
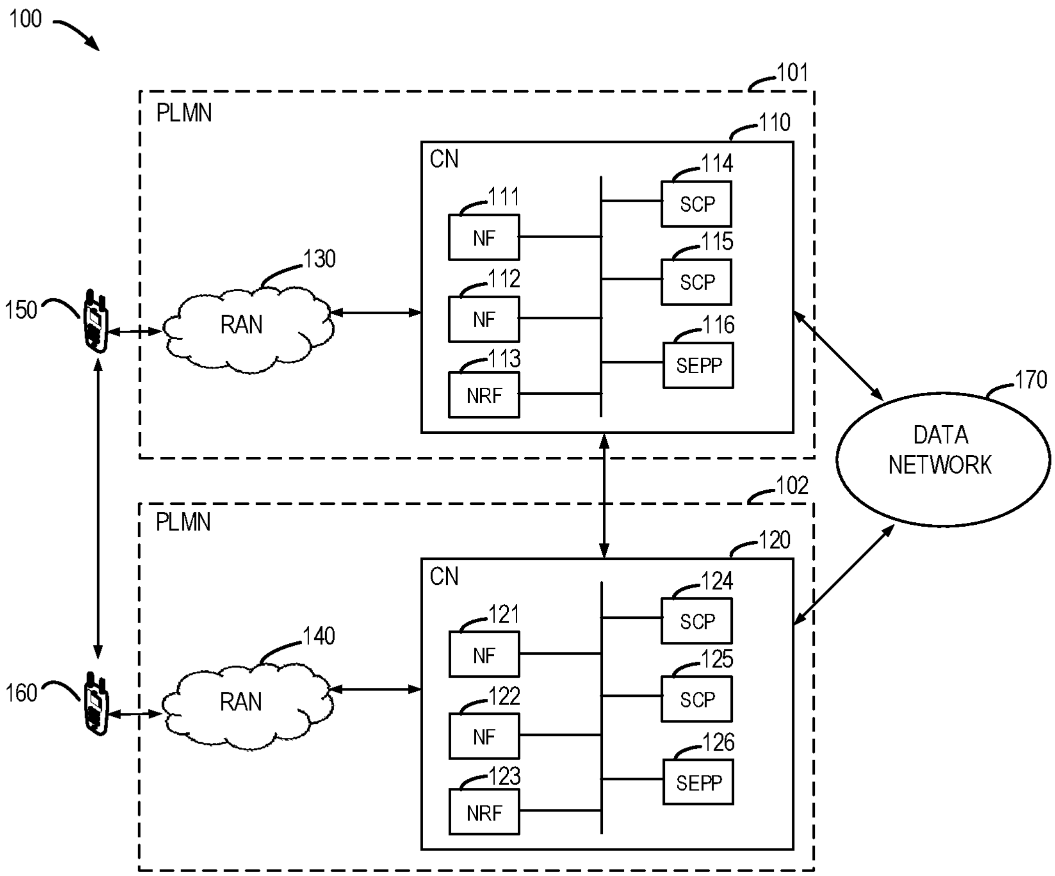
FIG. 1 illustrates an example communication network in which embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof. As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as fifth generation (5G) systems, Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, communications in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G), the future sixth generation (6G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the communication network and receives services therefrom. The communication network may be a core network (CN). The network device in CN may refer to any suitable NF such as a policy control function (PCF), an access management function (AMF), a session management function (SMF), a user plane function (UPF), unified data management (UDM), unified data repository (UDR), an authentication server function (AUSF), a network exposure function (NEF), etc.

The communication network may be a radio access network (RAN). The network device or element in RAN may refer to a base station (BS) or an access point (AP), for example, a node B (NodeB or NB), an evolved NodeB (eNodeB or eNB), a NR next generation NodeB (also referred to as a gNB), a Remote Radio Unit (RRU), a radio header (RH), a remote radio head (RRH), a relay, a low power node such as a femto, a pico, and so forth, depending on the applied terminology and technology. An radio access network (RAN) split architecture comprises a gNB-CU (centralized unit, hosting radio resource control (RRC), service data adaptation protocol (SDAP) and packet data convergence protocol (PDCP) layers) controlling a plurality of gNB-DUs (distributed unit, hosting radio link control (RLC), medium access control (MAC) and physical (PHY) layers).

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

Although functionalities described herein can be performed, in various example embodiments, in a fixed and/or a wireless network node, in other example embodiments, functionalities may be implemented in a user equipment apparatus (such as a cell phone or tablet computer or laptop computer or desktop computer or mobile IoT device or fixed IoT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

As discussed above, as an access token may be cached and reused by any NFc or SCPc before expiration, chances of misuse of the access token may be high. There may be a scenario where an access token is provided for a limited access, e.g., PLMN1 is providing the access token to PLMN2 for a restricted access of 1-2 times only. However, it is not possible in current technology, and the NRF may only reduce expiry time of the access token.

In some scenarios where a NFc is a malicious one, the NFc may bombard a NFp with service requests continuously as long as an access token is not expired and the NFp may become busy processing these particular NFc service requests. This may lead to Denial of Service to other NFcs.

Currently, there is no way to restrict a NFc, in a same PLMN or other PLMN, to use an access token for limited number of times. Secondly, a service communication proxy (SCP) or a security edge protection proxy (SEPP) or a real-time collaboration hub (RHub) may cache and reuse an issued access token. With roaming hub introduction where trust is scattered among multiple countries, limiting usage of an access token is very much required.

In view of this, embodiments of the present disclosure provide a solution for restricting usage of an access token with a usage count so as to solve the above and other potential issues. In this way, chances of misuse of an access token may be reduced and an access token may be efficiently used.

Principles and implementations of the present disclosure will be described in detail below with reference to the figures.

FIG. 1 illustrates a schematic diagram of an example communication network 100 in which embodiments of the present disclosure can be implemented. As shown in FIG. 1, the communication network 100 may involve a plurality of PLMNs 101 and 102, a plurality of devices 150 and 160, and a data network 170. The PLMN 101 may comprise a CN 110 and a RAN 130, and the PLMN 102 may comprise a CN 120 and a RAN 140.

As shown in FIG. 1, each of the CNs 110 and 120 may comprise a plurality of CN devices. For example, the CN 110 may comprise NFs 111 and 112, an NRF 113, SCPs 114 and 115 and a SEPP 116. Any of the NFs 111 and 112 may be a UPF, an AUSF, an AMF, a SMF, a UDM or any other suitable NFs. The CN 120 may comprise NFs 121 and 122, an NRF 123, SCPs 124 and 125 and a SEPP 126. Any of the NFs 121 and 122 may be a UPF, an AUSF, an AMF, a SMF, a UDM or any other suitable NFs. It is to be understood that the CN devices in CNs 110 and 120 are only for the purpose of illustration without suggesting any limitations. The communication network 100 may include more or less CN devices adapted for implementing embodiments of the present disclosure. The present disclosure does not limit the number and type of the CN devices.

The data network 170 may be Internet or any other suitable data networks. The RANs 130 and 140 may comprise any suitable network devices (not shown) and may adopt any suitable RAN technologies. It is to be understood that the communication network 100 may include any suitable number or type of the RANs, CNs and data networks adapted for implementing embodiments of the present disclosure.

In this example, the devices 150 and 160 are illustrated as mobile phones. It should be noted that any of the devices 150 and 160 may be any other suitable types of terminal devices or network devices. Further, it is to be understood that the number of the devices is only for the purpose of illustration without suggesting any limitations. The communication network 100 may include any suitable number or type of the devices adapted for implementing embodiments of the present disclosure.

In some embodiments, the device 150 may communicate with the data network 170 via the RAN 130 and the CN 110. The device 160 may communicate with the data network 170 via the RAN 140 and the CN 120.

In some embodiments, CN devices (e.g., the NFs 111 and 112) in each of the CNs 110 and 120 may communicate with each other directly. This procedure may be called as intra-PLMN direct communication. In some embodiments, CN devices (e.g., the NFs 111 and 112) in each of the CNs 110 and 120 may communicate with each other via one or more CN devices (e.g., the SCF 114 or 115 or both). This procedure may be called as intra-PLMN indirect communication. In some embodiments, a CN device (e.g., the NF 111 or 112) in the CN 110 may communicate with a CN device (e.g., the NF 121 or 122) in the CN 120 via CN devices (e.g., the NRF 113, 123 and the SEPP 116, 126). This procedure may be called as inter-PLMN direct communication.

Communications in the communication network 100 may be implemented according to any proper communication protocol(s), comprising, but not limited to, cellular communication protocols of the first generation (1G), the second generation (2G), the third generation (3G), the fourth generation (4G), the fifth generation (5G) or the future sixth generation (6G) wireless local network communication protocols, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

It is to be understood that the communication network 100 is merely an example, and embodiments of the present disclosure may also apply to any other suitable environments.

In some embodiments, the NF 111 may obtain an access token form the NRF 113 and request any service from the NF 112 by using the access token. In this case, the NF 111 serves as a NFc and the NF 112 serves as a NFp.

In some embodiments, the NF 111 may obtain an access token from the NRF 123 and request any service from the NF 121 or 122 by using the access token. In this case, the NF 111 serves as a NFc and the NF 121 or 122 serves as a NFp.

Conventionally, before an access token expires, a NFc may use the access token for any number of times to request services from a NFp. This may cause a high chance of misuse of the access token.

Embodiments of the present disclosure provide a solution for restricting usage of an access token so as to avoid or reduce the misuse of the access token. The solution will be described in connection with FIG. 2.

Figure 2:
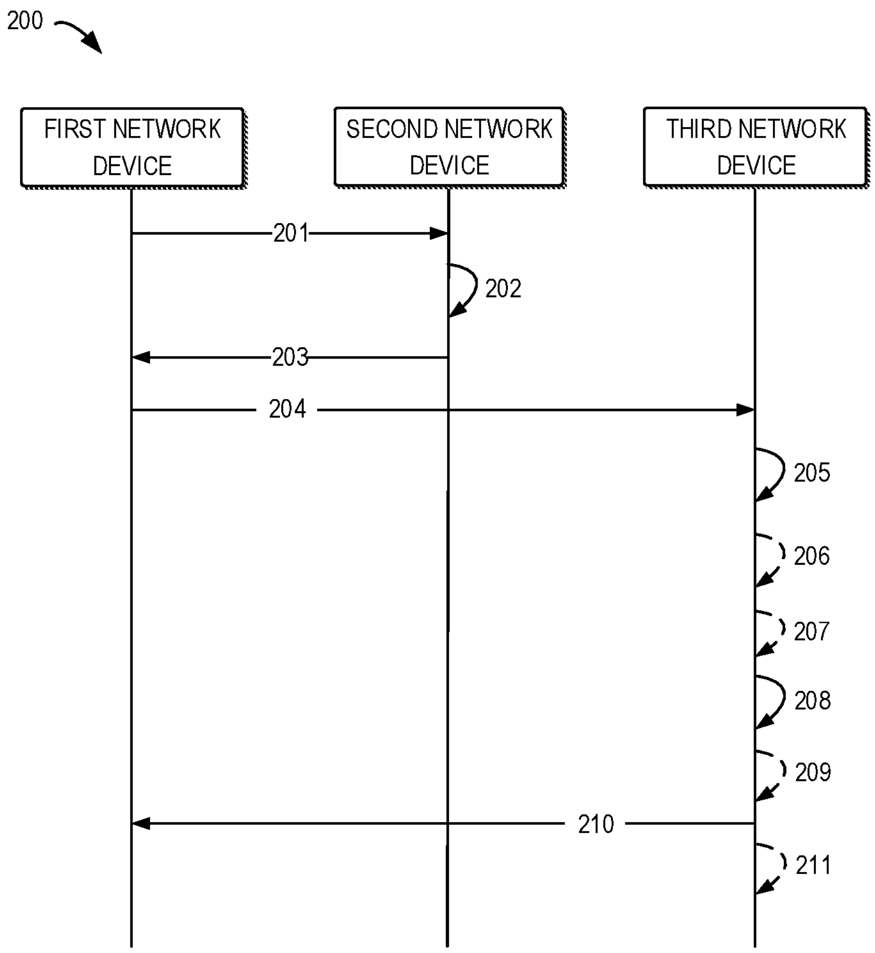
FIG. 2 illustrates a flowchart illustrating an example process for restricting usage of an access token according to some embodiments of the present disclosure.

FIG. 2 illustrates a flowchart illustrating an example process 200 for restricting usage of an access token according to some embodiments of the present disclosure. The process 200 may involve a first network device, a second network device and a third network device. In some embodiments, the first, second and third network devices may be any suitable CN devices. In some embodiments, any two of the first, second and third network devices may be in different PLMNs. In some embodiments, any two of the first, second and third network devices may be in the same PLMN.

As shown in FIG. 2, the first network device may transmit 201 an access token request to the second network device. The access token request may be used for obtaining an access token for service access to a target NF (e.g., NFp) of a specific NF type. In some embodiments, the access token request may be based on an identity of the target NF (e.g., targetNFInstanceId). In some embodiments, the access token request may be based on a type of the target NF (e.g., targetNFType).

In some embodiments, the access token request may comprise a suggested count value. In some embodiments, the suggested count value may be a suggestion for a first count value indicating the number of times an access token is allowed to be used. In the context of the present disclosure, the term "a first count value" may refer to a count value in an access token that is signed by an NRF and cannot be modified.

In some embodiments, the first network device may be a NFc. In some embodiments, the first network device may be a SCP for the NFc. In this case, the SCP may perform communication on behalf of the NFc, e.g., receive the access token request from the NFc and forward the access token request to the second network device. In some embodiments, the second network device may be a NRF. For example, the second network device may be a NRF for the NFc (for convenience, also referred to as NRFc herein). In another example, the second network device may be a NRF for the NFp (for convenience, also referred to as NRFp herein).

Upon reception of the access token request, the second network device may determine 202 the first count value indicating the number of times an access token is allowed to be used. In some embodiments, the second network device may check whether the NFc is authorized. If the NFc is authorized, the second network device may generate the access token and the first count value.

In some embodiments where the access token request is based on the identity of the target NF (e.g., targetNFInstanceId), the access token may be based on the identity of the NFp. In this case, the access token may be used exclusively to avail the service of the NFp. In some embodiments where the access token request is based on the type of the target NF (e.g., targetNFType), the access token may be based on the type of the NFp. In this case, the access token may be used to avail the services of one or more NFs with the same NF type.

In some embodiments, the second network device may determine the first count value based on profile parameters associated with the NFc available at the second network device. For example, the profile parameters associated with the NFc may comprise at least one of the following: a load, a configuration, a NF type or a service/operation type of the NFc. It is to be understood that any other suitable profile parameters associated with the NFc are also feasible.

In some embodiments, the second network device may determine the first count value based on profile parameters associated with the NFp available at the second network device. For example, the profile parameters associated with the NFp may comprise at least one of the following: a load, a configuration, a NF type or a service/operation type of the NFp. It is to be understood that any other suitable profile parameters associated with the NFc are also feasible.

In some embodiments, the second network device may determine the first count value based on an operator policy. In some embodiments where the access token request comprises the suggested count value, the second network device may determine the first count value based on the suggested count value.

It is to be understood that any combination of the above embodiments and any other suitable embodiments may also be applied for determination of the first count value. With the first count value, usage of the access token may be limited as needed.

Continue to refer to FIG. 2, upon determination of the access token associated with the first count value, the second network device may transmit 203 the access token with the first count value to the first network device. In some embodiments where the first network device is not the NFc itself, the first network device may forward the access token to the NFc.

The first network device may transmit 204 a service request with the access token to the third network device. In some embodiments, the third network device may be the NFp. In some embodiments, the third network device may be a SCP for the NFp (for convenience, may also referred to as SCPp herein). In this case, the SCP may perform communication on behalf of the NFp. In some embodiments, the third network device may be a SEPP for the NFp (for convenience, may also referred to as SEPPp herein). In this case, the SEPPp may perform communication on behalf of the NFp. In some embodiments where the first network device is not the NFc itself, the first network device may receive the service request to the NFp and forward the service request to the third network device.

In some embodiments, the first network device may determine, based on the first count value, whether the service request is allowed to be transmitted. In some embodiments, the first network device may store the first count value as an allowed count value. If a service request is transmitted, the first network device may decrement the allowed count value. In some embodiments, if the allowed count value is larger than a threshold value (for example, 0 or any other suitable value), the first network device may determine that a service request is allowed to be transmitted. If the allowed count value is equal to the threshold value, the first network device may determine that a service request is not allowed to be transmitted. If the service request is allowed to be transmitted, the first network device may transmit the service request. In this way, usage of an access token may be limited.

Based on the service request, the third network device may determine 205 a stored count value based on the access token. In some embodiments, the third network device may determine whether the access token is stored. If the access token is not stored, the third network device may store the access token.

In some embodiments, if the access token is associated with the identity of the target NF, the third network device may store 206 the access token at the third network device. In this case, the first count value is stored as the stored count value.

In some embodiments, if the access token is associated with the type of the target NF, the third network device may store 207 the access token at a fourth network device accessible to a set of NFs, and store the first count value as the stored count value. In some embodiments, the set of NFs may have the same type of the target NF. In some embodiments, the fourth network device may be a NRF. In some embodiments, the fourth network device may be an unstructured data storage function (UDSF). In some embodiments, the fourth network device may be any other central databases.

In some embodiments, the access token may be stored in a cache. It is to be understood that the access token may be stored in any other suitable ways.

Based on the stored count value, the third network device may determine 208 a service response to the service request. In some embodiments, if the stored count value is larger than a predetermined value, the third network device may provide, as the service response, a service requested in the service request. In some embodiments where the third network device is not the NFp itself, the third network device may forward the service request to the NFp and obtain the service response from the NFp.

In some embodiments, if the stored count value is equal to the predetermined value, the third network device may provide, as the service response, a rejection to the service request. In some embodiments, the predetermined value may be 0. It is to be understood that the predetermined value may be any other suitable values.

In some embodiments, if a service is provided as the service response, the third network device may decrement 209 the stored count value. In some embodiments where the access token is based on the identity of the target NF, everytime the NFp processes the service request from the NFc, the third network device may decrement the stored count value from the associated access token. In some embodiments where the access token is based on the type of the target NF, the third network device may fetch the stored count value from the fourth network device accessible to a set of NFs before providing the service. The stored count value in the fourth network device is decremented by the third network device for the respective access token after the service is rendered. Any NFc within the set of NFs may cache the access token and reuse the access token.

Upon determination of the service response, the third network device may transmit 210 the service response to the first network device. In some embodiments where the first network device is not the NFc itself, the first network device may forward the service request to the NFc.

In some embodiments, if the access token expires, the third network device may delete 211 the access token from the third network device. In some embodiments, the access token may be associated with a period of time. If the period of time passes since reception of the access token, the third network device may determine that the access token expires.

In this way, the number of uses of the access token may be controlled. It is to be noted that the process 200 as shown in FIG. 2 is merely an example, and may have additional or less operations. For illustration, some example embodiments will be described below in connection with FIGS. 3 to 5.

Figure 3:
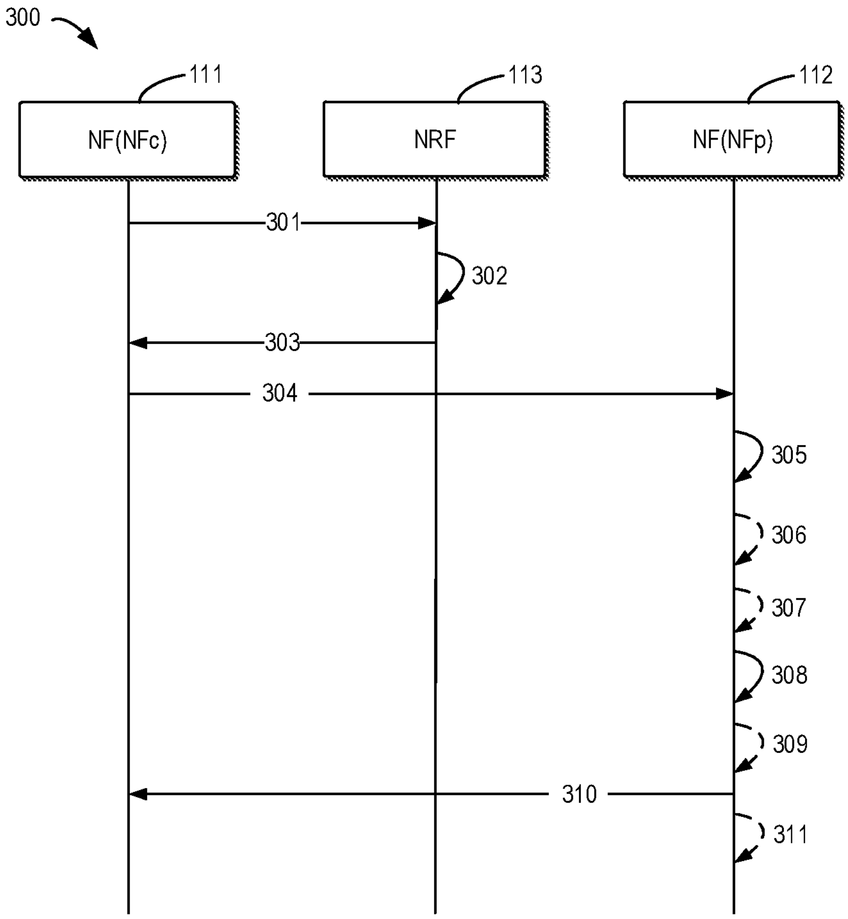
FIG. 3 illustrates a flowchart illustrating an example process for restricting usage of an access token for intra-public land mobile network (PLMN) direct communication of NFs according to some embodiments of the present disclosure.

FIG. 3 illustrates a flowchart illustrating an example process 300 for restricting usage of an access token for intra-PLMN direct communication of NFs according to some embodiments of the present disclosure. For the purpose of discussion, the process 300 will be described with reference to FIG. 1. It is assumed that the NF 111 is a NFc and the NF 112 is a NFp. In this example, the first network device is the NF 111, the second network device is the NRF 113, and the third network device is the NF 112.

With reference to FIG. 3, the NF 111 may transmit 301 an access token request to the NRF 113. In some embodiments, the access token request may comprise a suggested count value. It is to be understood that the access token request may not comprise a suggested count value.

Upon reception of the access token request, the NRF 113 may determine 302 the first count value indicating the number of times an access token is allowed to be used. In some embodiments, the NRF 113 may determine the first count value based on at least one of the following: profile parameters associated with the NF 111 available at the NRF 113; profile parameters associated with the NF 112 available at the NRF 113; an operator policy; or the suggested count value. It is to be understood that any combination of the above information and any other suitable information may also be applied for determination of the first count value. With the first count value, usage of the access token may be limited as needed.

Upon determination of the access token associated with the first count value, the NRF 113 may transmit 303 the access token with the first count value to the NF 111.

The NF 111 may transmit 304 a service request with the access token to the NF 112. In some embodiments, the NF 111 may determine, based on the first count value, whether the service request is allowed to be transmitted. In some embodiments, the NF 111 may store the first count value as an allowed count value. If a service request is transmitted, the NF 111 may decrement the allowed count value. In some embodiments, if the allowed count value is larger than a threshold value (for example, 0 or any other suitable value), the NF 111 may determine that a service request is allowed to be transmitted. If the allowed count value is equal to the threshold value, the NF 111 may determine that a service request is not allowed to be transmitted. If the service request is allowed to be transmitted, the NF 111 may transmit the service request. In this way, usage of an access token may be limited.

Based on the service request, the NF 112 may determine 305 a stored count value based on the access token. In some embodiments, the NF 112 may determine whether the access token is stored. If the access token is not stored, the NF 112 may store the access token.

In some embodiments, if the access token is associated with the identity of the target NF, the NF 112 may store 306 the access token at the NF 112. In this case, the first count value is stored as the stored count value.

In some embodiments, if the access token is associated with the type of the target NF, the NF 112 may store 307 the access token at a fourth network device accessible to a set of NFs, and store the first count value as the stored count value. In some embodiments, the set of NFs may have the same type of the target NF. In some embodiments, the fourth network device may be a NRF or an UDSF or any other central databases.

Based on the stored count value, the NF 112 may determine 308 a service response. In some embodiments, if the stored count value is larger than a predetermined value, the NF 112 may provide, as the service response, a service requested in the service request. If the stored count value is equal to the predetermined value, the NF 112 may provide, as the service response, a rejection to the service request. In some embodiments, the predetermined value may be 0. It is to be understood that the predetermined value may be any other suitable values.

In some embodiments, if a service is provided as the service response, the NF 112 may decrement 309 the stored count value.

Upon determination of the service response, the NF 112 may transmit 310 the service response to the NF 111. In some embodiments, if the access token expires, the NF 311 may delete 370 the access token from the NF 112.

In this way, usage of an access token in an intra-PLMN direct communication may be controlled. The operations of the process 300 substantially correspond to that of the process 200, and thus other details are not repeated here for conciseness. It is to be noted that the process 300 as shown in FIG. 3 is merely an example, and may have additional or less operations.

Figure 4:
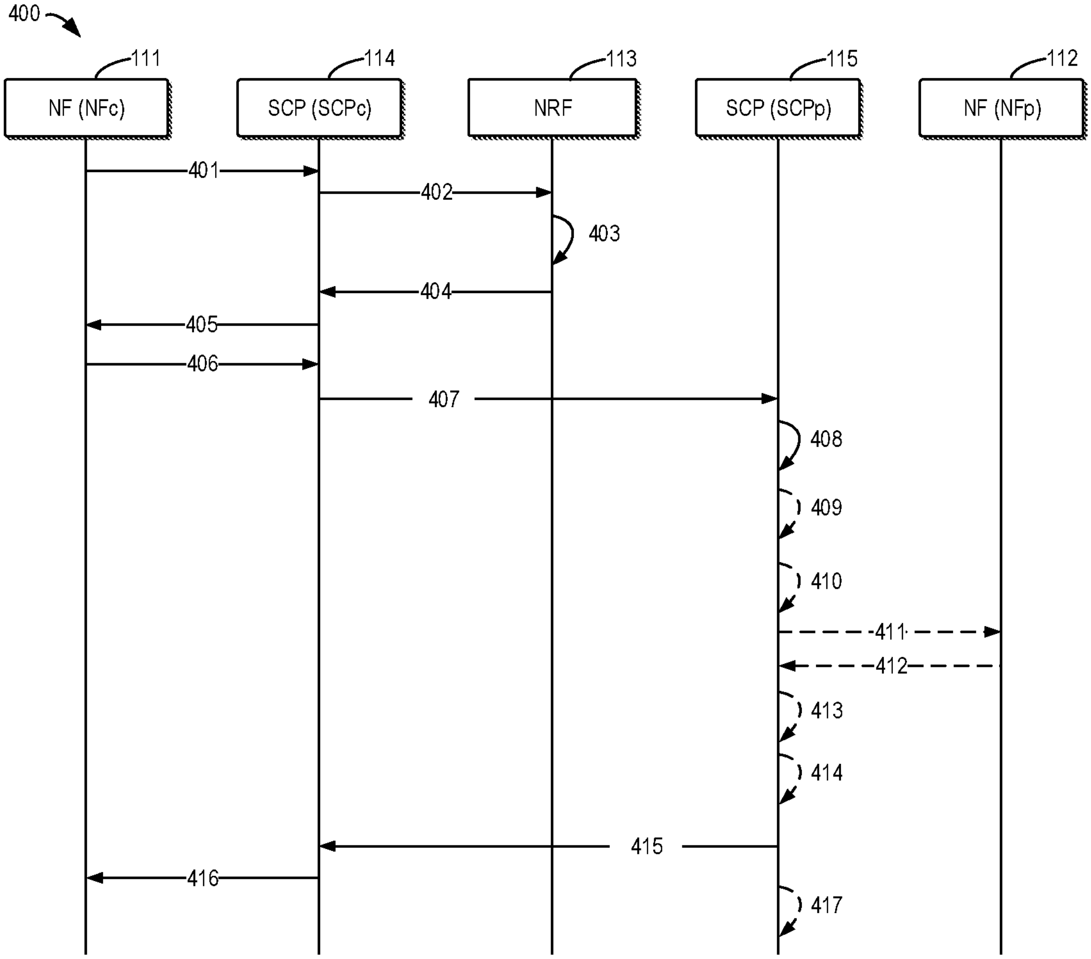
FIG. 4 illustrates a flowchart illustrating an example process for restricting usage of an access token for intra-PLMN indirect communication of NFs according to some embodiments of the present disclosure.

FIG. 4 illustrates a flowchart illustrating an example process 400 for restricting usage of an access token for intra-PLMN indirect communication of NFs according to some embodiments of the present disclosure. For the purpose of discussion, the process 400 will be described with reference to FIG. 1. It is assumed that the NF 111 is a NFc and the NF 112 is a NFp. In this example, the first network device is the NF 111, the second network device is the NRF 113, and the third network device is the SCP 115. The SCP 114 is used for the NF 111 and the SCP 115 is used for the NF 112. In some embodiments, the SCP 114 and the SCP 115 may be the same device. In some embodiments, the SCP 114 and the SCP 115 may be different devices.

With reference to FIG. 4, the NF 111 may transmit 401 an access token request to the SCP 114, and the SCP 114 may forward 402 the access token request to the NRF 113. In some embodiments, the access token request may comprise a suggested count value. It is to be understood that the access token request may not comprise a suggested count value.

Upon reception of the access token request, the NRF 113 may determine 403 the first count value indicating the number of times an access token is allowed to be used. In some embodiments, the NRF 113 may determine the first count value based on at least one of the following: profile parameters associated with the NF 111 available at the NRF 113; profile parameters associated with the NF 112 available at the NRF 113; an operator policy; or the suggested count value. It is to be understood that any combination of the above information and any other suitable information may also be applied for determination of the first count value. With the first count value, usage of the access token may be limited as needed.

Upon determination of the access token associated with the first count value, the NRF 113 may transmit 404 the access token with the first count value to the SCP 114 and the SCP 114 may forward 405 the access token to the NF 111.

The NF 111 may transmit 406 a service request with the access token to the SCP 114 and the SCP 114 may forward 407 the service request to the SCP 115.

In some embodiments, the NF 111 may determine, based on the first count value, whether a service request is allowed to be transmitted. In some embodiments, the NF 111 may store the first count value as an allowed count value. If a service request is transmitted, the NF 111 may decrement the allowed count value. In some embodiments, if the allowed count value is larger than a threshold value (for example, 0 or any other suitable value), the NF 111 may determine that a service request is allowed to be transmitted. If the allowed count value is equal to the threshold value, the NF 111 may determine that a service request is not allowed to be transmitted. If the service request is allowed to be transmitted, the NF 111 may transmit the service request. In this way, usage of an access token may be limited.

Based on the service request, the SCP 115 may determine 408 a stored count value based on the access token. In some embodiments, the SCP 115 may determine whether the access token is stored. If the access token is not stored, the SCP 115 may store the access token.

In some embodiments, if the access token is associated with the identity of the target NF, the SCP 115 may store 409 the access token at the SCP 115. In this case, the first count value is stored as the stored count value.

In some embodiments, if the access token is associated with the type of the target NF, the SCP 115 may store 410 the access token at a fourth network device accessible to a set of NFs, and store the first count value as the stored count value. In some embodiments, the set of NFs may have the same type of the target NF. In some embodiments, the fourth network device may be a NRF or an UDSF or any other central databases.

Based on the stored count value, the SCP 115 may determine a service response to the service request. In some embodiments, if the stored count value is larger than a predetermined value, the SCP 115 may forward 411 the service request to the NF 112 and obtain 412, from the NF 112, a service requested in the service request. If the stored count value is equal to the predetermined value, the SCP 115 may determine 413, as the service response, a rejection to the service request. In some embodiments, the predetermined value may be 0. It is to be understood that the predetermined value may be any other suitable values.

In some embodiments, if a service is provided as the service response, the SCP 115 may decrement 414 the stored count value.

Upon determination of the service response, the SCP 115 may transmit 415 the service response to the SCP 114 and the SCP 114 may forward 416 the service response to the NF 111. In some embodiments, if the access token expires, the SCP 115 may delete 417 the access token.

In this way, usage of an access token in an intra-PLMN indirect communication may be controlled. The operations of the process 400 substantially correspond to that of the process 200, and thus other details are not repeated here for conciseness. It is to be noted that the process 400 as shown in FIG. 4 is merely an example, and may have additional or less operations.

Figure 5:
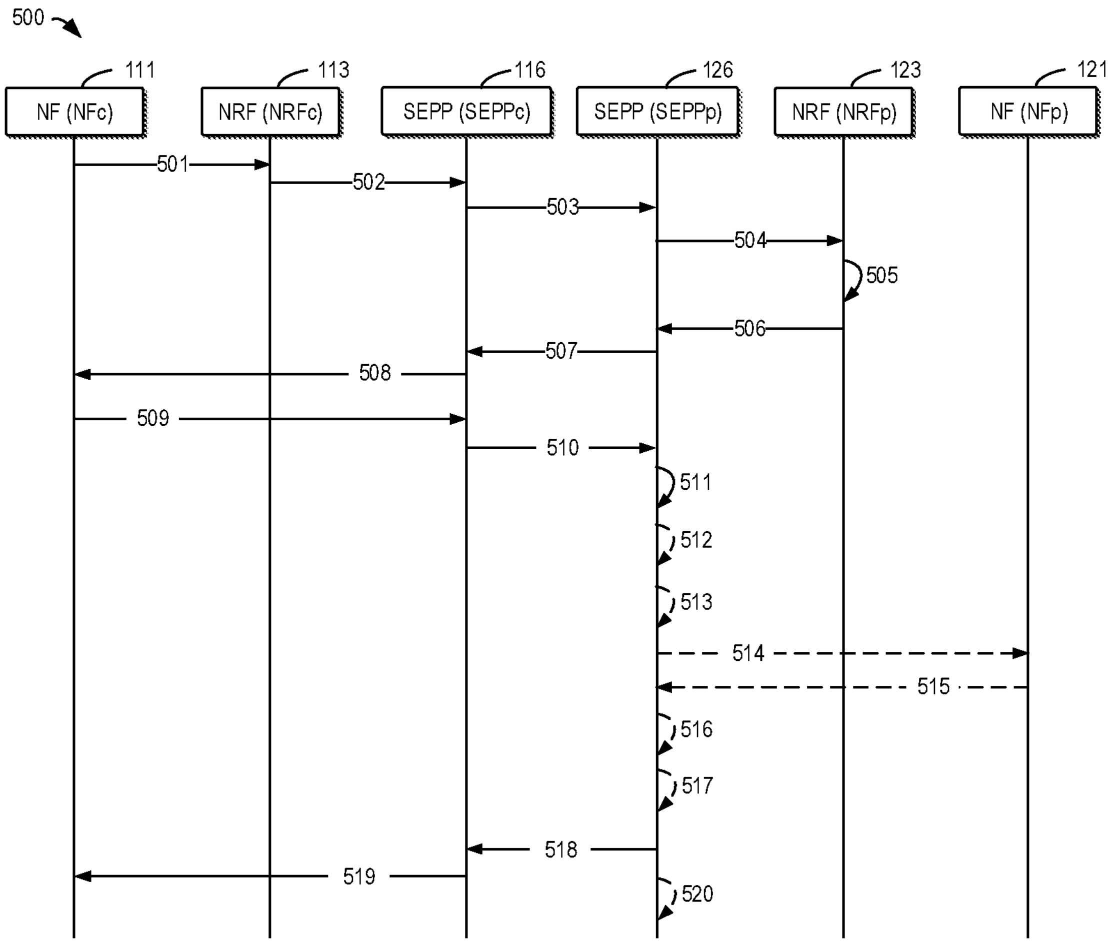
FIG. 5 illustrates a flowchart illustrating an example process for restricting usage of an access token for inter-PLMN communication of NFs according to some embodiments of the present disclosure.

FIG. 5 illustrates a flowchart illustrating an example process 500 for restricting usage of an access token for inter-PLMN communication of NFs according to some embodiments of the present disclosure. For the purpose of discussion, the process 500 will be described with reference to FIG. 1. It is assumed that the NF 111 is a NFc and the NF 121 is a NFp. In this example, the first network device is the NF 111 or SEPP 116, the second network device is the NRF 123 for the NF 121, and the third network device is the SEPP 126.

With reference to FIG. 5, the NF 111 may transmit 501 an access token request to the NRF 113, and the NRF 113 may forward 502 the access token request to the SEPP 116. The SEPP 116 may forward 503 the access token request to the SEPP 126 and the SEPP 126 may forward 504 the access token request to the NRF 123. In some embodiments, the access token request may comprise a suggested count value. It is to be understood that the access token request may not comprise a suggested count value.

Upon reception of the access token request, the NRF 123 may determine 505 the first count value indicating the number of times an access token is allowed to be used. In some embodiments, the NRF 123 may determine the first count value based on at least one of the following: profile parameters associated with the NF 111 available at the NRF 123; profile parameters associated with the NF 121 available at the NRF 123; an operator policy; or the suggested count value. It is to be understood that any combination of the above information and any other suitable information may also be applied for determination of the first count value. With the first count value, usage of the access token may be limited as needed.

Upon determination of the access token associated with the first count value, the NRF 123 may transmit 506 the access token with the first count value to the SEPP 126 and the SEPP 126 may forward 507 the access token to the SEPP 116. The SEPP 116 may forward 508 the access token to the NF 111.

The NF 111 may transmit 509 a service request with the access token to the SEPP 116 and the SEPP 116 may forward 510 the service request to the SEPP 126. In some embodiments, the NF 111 may determine, based on the first count value, whether a service request is allowed to be transmitted. In some embodiments, the NF 111 may store the first count value as an allowed count value. If a service request is transmitted, the NF 111 may decrement the allowed count value. In some embodiments, if the allowed count value is larger than a threshold value (for example, 0 or any other suitable value), the NF 111 may determine that a service request is allowed to be transmitted. If the allowed count value is equal to the threshold value, the NF 111 may determine that a service request is not allowed to be transmitted. If the service request is allowed to be transmitted, the NF 111 may transmit the service request. In this way, usage of an access token may be limited.

Based on the service request, the SEPP 126 may determine 511 a stored count value based on the access token. In some embodiments, the SEPP 126 may determine whether the access token is stored. If the access token is not stored, the SEPP 126 may store the access token.

In some embodiments, if the access token is associated with the identity of the target NF, the SEPP 126 may store 512 the access token at the SEPP 126. In this case, the first count value is stored as the stored count value.

In some embodiments, if the access token is associated with the type of the target NF, the SEPP 126 may store 513 the access token at a fourth network device accessible to a set of NFs, and store the first count value as the stored count value. In some embodiments, the set of NFs may have the same type of the target NF. In some embodiments, the fourth network device may be a NRF or an UDSF or any other central databases.

In some embodiments, if the stored count value is larger than a predetermined value, the SEPP 126 may forward 514 the service request to the NF 121 and obtain 515, from the NF 121, a service requested in the service request. If the stored count value is equal to the predetermined value, the SEPP 126 may determine 516, as the service response, a rejection to the service request. In some embodiments, the predetermined value may be 0. It is to be understood that the predetermined value may be any other suitable values.

In some embodiments, if a service is provided as the service response, the SEPP 126 may decrement 517 the stored count value.

Upon determination of the service response, the SEPP 126 may transmit 518 the service response to the SEPP 116, and the SEPP 116 may forward 519 the service response to the NF 111. In some embodiments, if the access token expires, the SEPP 126 may delete 520 the access token.

In this way, usage of an access token in an inter-PLMN communication may be controlled. The operations of the process 500 substantially correspond to that of the process 200, and thus other details are not repeated here for conciseness. It is to be noted that the process 500 as shown in FIG. 5 is merely an example, and may have additional or less operations.

Figure 6:
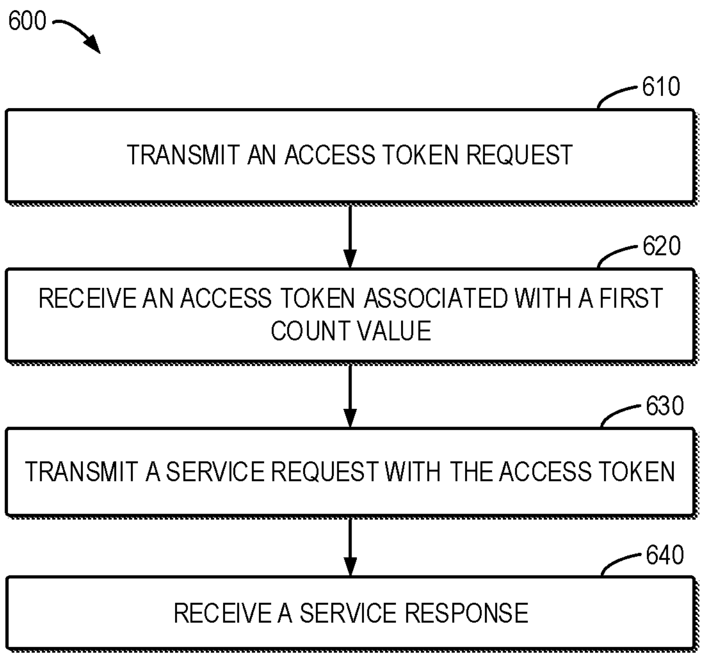
FIG. 6 illustrates a flowchart of an example method implemented at a first network device according to some embodiments of the present disclosure.

Corresponding to the above processes, example embodiments of the present disclosure also provide methods of communication. FIG. 6 illustrates a flowchart of an example method 600 implemented at a first network device according to some embodiments of the present disclosure. For the purpose of discussion, the method 600 will be described with reference to FIG. 1.

At block 610, a first network device transmits an access token request to a second network device. In some embodiments, the first network device may be a NFc, and the second network device may be a NRF. In some embodiments, the first network device may be a SCP for a NFc, and the second network device may be a NRF. In some embodiments, the first network device may be a NFc, and the second network device may be a NRF for a NFp.

In some embodiments, the access token request may comprise a suggested count value. In some embodiments, the access token request may not comprise a suggested count value. It is to be understood that the access token request may comprise any suitable information.

At block 620, the first network device receives, from the second network device, an access token associated with a first count value, the first count value indicating the number of times the access token is allowed to be used.

At block 630, the first network device transmits, to a third network device, a service request with the access token. In some embodiments, the first network device may determine, based on the first count value, whether the service request is allowed to be transmitted. If the service request is allowed to be transmitted, the first network device may transmit the service request.

In some embodiments where the first network device is a NFc and the second network device is a NRF, the third network device may be a NFp, e.g., as described in the process 300. In some embodiments where the first network device is a NFc or a SCP for a NFc and the second network device is a NRF, the third network device may be a SCP for a NFp, e.g., as described in the process 400. In some embodiments where the first network device is a NFc in a first PLMN and the second network device is a NRF for a NFp in a second PLMN, the third network device may be a SEPP for the NFp, e.g., as described in the process 500.

At block 640, the first network device receives, from the third network device, a service response determined based on the first count value and the access token. In some embodiments, the first network device may receive a service requested in the service request. In some embodiments, the first network device may receive a rejection to the service request. In this way, a behavior at a NFc for restricting usage of an access token is specified.

Figure 7:
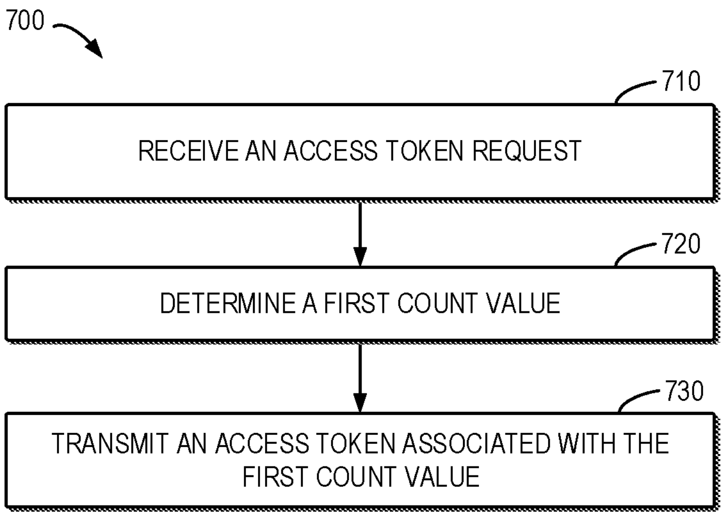
FIG. 7 illustrates a flowchart of an example method implemented at a second network device according to some embodiments of the present disclosure.

FIG. 7 illustrates a flowchart of an example method 700 implemented at a second network device according to some embodiments of the present disclosure. For the purpose of discussion, the method 700 will be described with reference to FIG. 1.

At block 710, a second network device receives an access token request from a first network device. In some embodiments, the first network device may be a NFc, and the second network device may be a NRF. In some embodiments, the first network device may be a SCP for a NFc, and the second network device may be a NRF. In some embodiments, the first network device may be a NFc, and the second network device may be a NRF for a NFp.

In some embodiments, the access token request may comprise a suggested count value. In some embodiments, the access token request may not comprise a suggested count value. It is to be understood that the access token request may comprise any suitable information.

At block 720, the second network device determines a first count value indicating the number of times an access token is allowed to be used. In some embodiments, the second network device may determine the first count value based on at least one of the following: the suggested count value, profile parameters associated with the NFc available at the second network device, profile parameters associated with the NFp available at the second network device, or an operator policy.

At block 720, the second network device transmits, to the first network device, the access token associated with the first count value.

In this way, a behavior at a NRF for restricting usage of an access token is specified.

Figure 8:
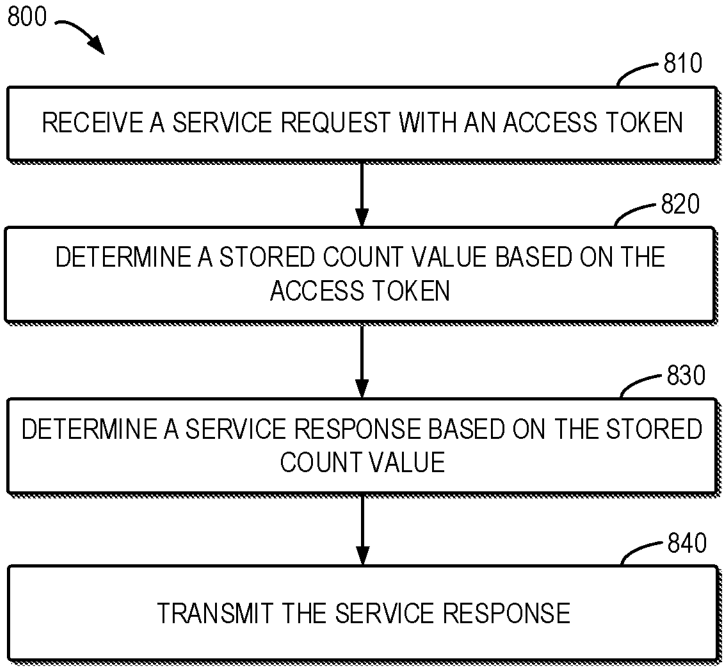
FIG. 8 illustrates a flowchart of an example method implemented at a third network device according to some embodiments of the present disclosure.

FIG. 8 illustrates a flowchart of an example method 800 implemented at a third network device according to some embodiments of the present disclosure. For the purpose of discussion, the method 800 will be described with reference to FIG. 1.

At block 810, a third network device receives, from a first network device, a service request with an access token, the access token being associated with a first count value, the first count value indicating the number of times the access token is allowed to be used.

In some embodiments, the first network device may be a NFc and the third network device may be a NFp. In some embodiments, the first network device may be a NFc or a SCP for a NFc, and the third network device may be a SCP for a NFp. In some embodiments, the first network device may be a NFc in a first PLMN, and the third network device may be a SEPP for the NFp.

At block 820, the third network device determines a stored count value based on the access token. In some embodiments where the access token is associated with an identity of a target NF, if the access token is not stored, the third network device may store the access token at the third network device. In some embodiments where the access token is associated with a type of a target NF, if the access token is not stored, the third network device may store the access token at a fourth network device accessible to a set of NFs. In some embodiments, the fourth network device may be a NRF, an UDSF, or a central database. In these embodiments, the first count value is stored as the stored count value.

In some embodiments, if a service is provided, the third network device may decrement the stored count value. That is, the stored count value may decrease as service access increases. Upon reception of the service request, the third network device may obtain the stored count value from the third network device or the fourth network device based on the access token.

At block 830, the third network device determines a service response based on the stored count value. In some embodiments, if the stored count value is larger than a predetermined value, the third network device may provide, as the service response, a service requested in the service request. In some embodiments, if the stored count value is equal to the predetermined value, the third network device may provide, as the service response, a rejection to the service request.

At block 840, the third network device transmits the service response to the first network device. In some embodiments, if the access token expires, the third network device may delete the access token from the third network device or the fourth network device.

In this way, a behavior at a NFp for restricting usage of an access token is specified.

Example embodiments of the present disclosure also provide the corresponding apparatus. In some embodiments, an apparatus (for example, the first network device) capable of performing the method 600 may comprise means for performing the respective steps of the method 600. The means may be implemented in any suitable form. For example, the means may be implemented in a circuitry or software module.

In some embodiments, the apparatus comprises: means for transmitting, at a first network device, an access token request to a second network device; means for receiving, from the second network device, an access token associated with a first count value, the first count value indicating the number of times the access token is allowed to be used; means for transmitting, to a third network device, a service request with the access token; and means for receiving, from the third network device, a service response determined based on the first count value and the access token.

In some embodiments, the means for transmitting the access token request comprises means for transmitting, to the second network device, the access token request comprising a suggested count value.

In some embodiments, the means for transmitting the service request comprises: means for determining, based on the first count value, that the service request is allowed to be transmitted.

In some embodiments, the means for receiving the service response comprises: means for receiving a service requested in the service request; or means for receiving a rejection to the service request.

In some embodiments, an apparatus (for example, the second network device) capable of performing the method 700 may comprise means for performing the respective steps of the method 700. The means may be implemented in any suitable form. For example, the means may be implemented in a circuitry or software module.

In some embodiments, the apparatus comprises: means for receiving an access token request from a first network device; means for determining a first count value indicating the number of times an access token is allowed to be used; and means for transmitting, to the first network device, the access token associated with the first count value.

In some embodiments, the means for receiving the access token request comprises: means for receiving, from the first network device, the access token request comprising a suggested count value.

In some embodiments, the means for determining the first count value comprises: means for determining the first count value based on at least one of the following: the suggested count value, profile parameters associated with a NFc available at the second network device, profile parameters associated with a NFp available at the second network device, or an operator policy.

In some embodiments, an apparatus (for example, the third network device) capable of performing the method 800 may comprise means for performing the respective steps of the method 800. The means may be implemented in any suitable form. For example, the means may be implemented in a circuitry or software module.

In some embodiments, the apparatus comprises: means for receiving, from a first network device, a service request with an access token, the access token being associated with a first count value, the first count value indicating the number of times the access token is allowed to be used; means for determining a stored count value based on the access token; means for determining a service response based on the stored count value; and means for transmitting the service response to the first network device.

In some embodiments, the means for determining the service response comprises: means for, in accordance with a determination that the stored count value is larger than a predetermined value, providing, as the service response, a service requested in the service request; and means for, in accordance with a determination that the stored count value is equal to the predetermined value, providing, as the service response, a rejection to the service request.

In some embodiments where the access token is associated with an identity of a target NF, the apparatus may further comprise: means for, in accordance with a determination that the access token is not stored, storing the access token at the third network device, the first count value being stored as the stored count value; means for, in accordance with a determination that a service is provided, decrementing the stored count value; or means for, in accordance with a determination that the access token expires, deleting the access token from the third network device.

In some embodiments where the access token is associated with a type of a target NF, the apparatus may further comprise: means for, in accordance with a determination that the access token is not stored, storing the access token at a fourth network device accessible to a set of NFs, the first count value being stored as the stored count value; means for, in accordance with a determination that a service is provided, decrementing the stored count value; or means for, in accordance with a determination that the access token expires, deleting the access token from the fourth network device. In some embodiments, the fourth network device is a NRF, an UDSF, or a central database.

For the above apparatuses, in some embodiments, the first network device is a NFc, the second network device is a NRF, and the third network device is a NFp. In some embodiments, the first network device is a NFc or a SCP for the NFc, the second network device is a NRF, and the third network device is a SCP for a NFp. In some embodiments, the first network device is a NFc in a first PLMN, the second network device is a NRF for a NFp in a second PLMN, and the third network device is a SEPP for the NFp.

Figure 9:
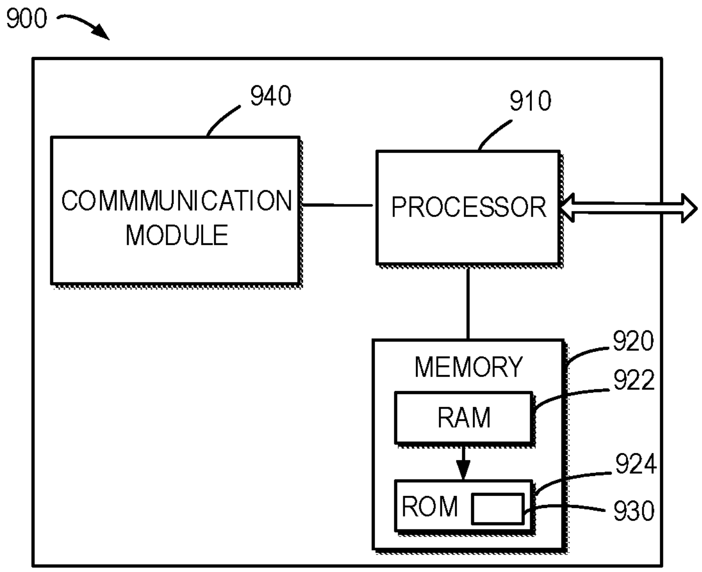
FIG. 9 illustrates a simplified block diagram of a device that is suitable for implementing embodiments of the present disclosure.

FIG. 9 is a simplified block diagram of a device 900 that is suitable for implementing embodiments of the present disclosure. The device 900 may be provided to implement any of network devices, for example, as shown in FIG. 1. As shown, the device 900 includes one or more processors 910, one or more memories 920 coupled to the processor 910, and one or more communication modules 940 coupled to the processor 910.

The communication module 940 is for bidirectional communications. The communication module 940 has at least one antenna to facilitate communication. The communication interface may represent any interface that is necessary for communication with other network elements.

The processor 910 may be of any type suitable to the local technical network and may include one or more of the following: general purpose computers, special purpose computers, microprocessors, digital signal processors (DSPs) and processors based on multicore processor architecture, as non-limiting examples. The device 900 may have multiple processors, such as an application specific integrated circuit chip that is slaved in time to a clock which synchronizes the main processor.

The memory 920 may include one or more non-volatile memories and one or more volatile memories. Examples of the non-volatile memories include, but are not limited to, a Read Only Memory (ROM) 924, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 922 and other volatile memories that will not last in the power-down duration.

A computer program 930 includes computer executable instructions that are executed by the associated processor 910. The program 930 may be stored in the ROM 920. The processor 910 may perform any suitable actions and processing by loading the program 930 into the RAM 920.

The embodiments of the present disclosure may be implemented by means of the program 930 so that the device 900 may perform any process of the disclosure as discussed with reference to FIGS. 1 to 8. The embodiments of the present disclosure may also be implemented by hardware or by a combination of software and hardware.

Figure 10:
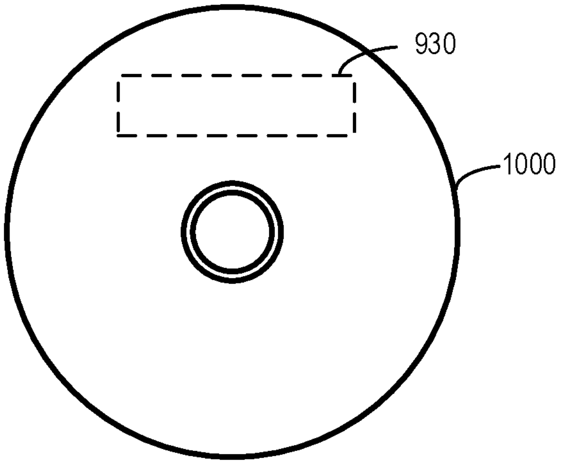
FIG. 10 illustrates a block diagram of an example computer readable medium in accordance with some embodiments of the present disclosure.

In some embodiments, the program 930 may be tangibly contained in a computer readable medium which may be included in the device 900 (such as in the memory 920) or other storage devices that are accessible by the device 900. The device 900 may load the program 930 from the computer readable medium to the RAM 922 for execution. The computer readable medium may include any types of tangible non-volatile storage, such as ROM, EPROM, a flash memory, a hard disk, CD, DVD, and the like. FIG. 10 shows an example of the computer readable medium 1000 in form of CD or DVD. The computer readable medium has the program 930 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 600 or 700 or 800 as described above with reference to FIGS. 6 to 8. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. The term "non-transitory," as used herein, is a limitation of the medium itself (i.e., tangible, not a signal) as opposed to a limitation on data storage persistency (e.g., RAM vs. ROM).

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first network device comprising:

at least one processor; and at least one memory storing instructions that, when executed by the at least one processor, cause the first network device at least to:

transmit, from the first network device to a second network device comprising a network repository function of a same public land mobile network, an access token request comprising a suggested count value for obtaining an access token for service access to a target network function, wherein the first network device comprises a network function consumer and the target network function comprises a network function producer;

receive, from the second network device, an access token associated with a first count value, the first count value determined by the second network device based on the suggested count value, the first count value indicating the number of times the access token is allowed to be used, wherein the first count value is signed by the second network device and is not modifiable by the first network device;

store, at the first network device, the first count value as an allowed count value for the access token;

determine, before transmitting a service request using the access token, whether the service request is allowed to be transmitted based on whether the allowed count value is greater than a threshold value;

in accordance with determining that the allowed count value is greater than the threshold value, transmit, to a third network device comprising the target network function, a service request with the access token;

decrement, by the first network device, the allowed count value in response to transmitting the service request with the access token; and receive, from the third network device, a service response determined based on a stored count value associated with the access token, wherein the service response comprises either a service requested in the service request when the stored count value is greater than a predetermined value or a rejection of the service request when the stored count value is equal to the predetermined value.

2. The first network device of claim 1, wherein the access token request comprises a target network function instance identifier identifying the target network function.

3. The first network device of claim 2, wherein the access token is based on an identity of the target network function and is usable exclusively to obtain service from the target network function.

4. The first network device of claim 3, wherein the first count value is determined by the second network device based on one or more profile parameters associated with the first network device.

5. The first network device of claim 4, wherein the one or more profile parameters associated with the first network device comprise at least one of a load of the first network device, a configuration of the first network device, a network function type of the first network device, or a service or operation type of the first network device.

6. The first network device of claim 3, wherein the first count value is determined by the second network device based on one or more profile parameters associated with the target network function.

7. The first network device of claim 6, wherein the one or more profile parameters associated with the target network function comprise at least one of a load of the target network function, a configuration of the target network function, a network function type of the target network function, or a service or operation type of the target network function.

8. The first network device of claim 7, wherein the first count value is determined by the second network device based on an operator policy and the suggested count value.

9. The first network device of claim 8, wherein the threshold value is zero, and wherein the first network device is caused to determine that the service request is allowed to be transmitted based on the allowed count value being greater than zero.

10. The first network device of claim 9, wherein the first network device is further caused to determine that a subsequent service request using the access token is not allowed to be transmitted based on the allowed count value being equal to zero.

11. The first network device of claim 10, wherein the service response is received from the third network device after the third network device stores the access token at the third network device and stores the first count value as the stored count value.

12. The first network device of claim 11, wherein the service response comprises the service requested in the service request, and wherein the service response is received from the third network device after the third network device decrements the stored count value in response to providing the service requested in the service request.

* * * * *